United States Patent [19]
Sather
[11] 3,723,842
[45] Mar. 27, 1973

[54] DIGITAL SERVO MOTOR CONTROL WITH AN ERROR RATE DERIVATIVE CIRCUIT

[75] Inventor: Dalaine C. Sather, Cedar Rapids, Iowa

[73] Assignee: Collins Radio Company, Dallas, Tex.

[22] Filed: Mar. 9, 1972

[21] Appl. No.: 233,197

[52] U.S. Cl. ..................318/602, 318/610, 318/621, 318/601
[51] Int. Cl. ..............................................G05b 19/28
[58] Field of Search......318/600, 601, 602, 603, 604, 318/610, 621

[56] References Cited

UNITED STATES PATENTS

| | | | |
|---|---|---|---|
| 2,928,033 | 3/1960 | Abbott | 318/604 |
| 3,621,357 | 11/1971 | Kubo et al. | 318/610 X |
| 3,206,665 | 9/1965 | Burlingham | 318/603 X |
| 3,088,104 | 4/1963 | Lord | 318/601 X |

*Primary Examiner*—T. E. Lynch
*Attorney*—Bruce C. Lutz et al.

[57] ABSTRACT

A serial digital word circuit utilizing basic summing, multiplying, sign detection and overflow detection circuits for providing an error rate derivative circuit. The error rate derivative is accomplished by comparing a present digital word time serial digital word feedback signal with a previous digital word time serial digital word feedback signal and adding this to a comparison of the feedback signal and a command signal. As the feedback signal indicates a controlled condition is approaching the commanded condition, the sum of the added digital words reduces in magnitude and thus the effect of the control signal is more rapidly reduced as the condition reaches a desired value.

6 Claims, 1 Drawing Figure

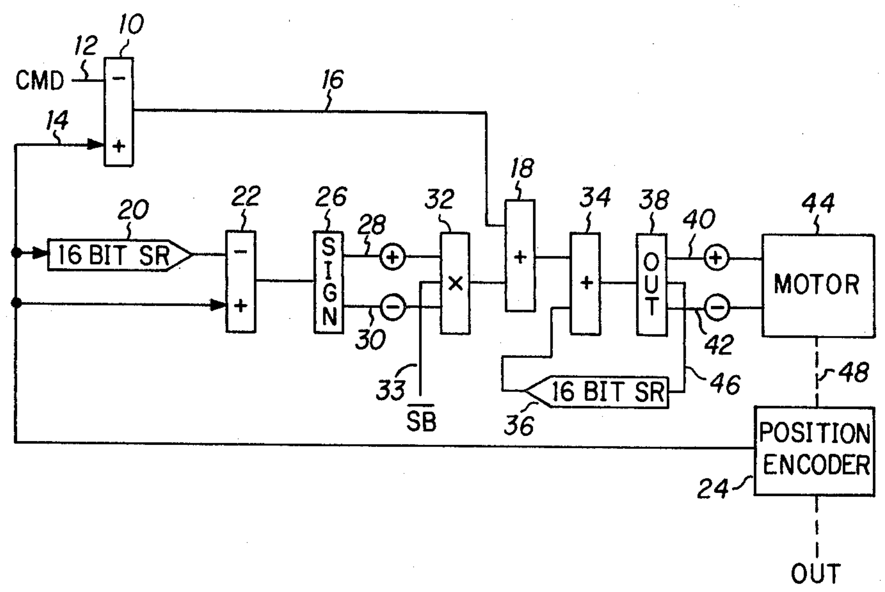
CMD
16 BIT SR
S I G N
SB
MOTOR
O U T
16 BIT SR
POSITION ENCODER
OUT

DIGITAL SERVO MOTOR CONTROL WITH AN ERROR RATE DERIVATIVE CIRCUIT

The present invention is generally concerned with electronics and more specifically concerned with a circuit for utilizing serial digital words in an error rate sensitive and compensating control system.

It is realized that there are many and various types of error rate compensating circuits in the prior art. However, it is believed that none of these circuits provide the digital accuracy and the component simplicity of the present invention.

The present invention incorporates various simple blocks as outlined in my previous applications which are also assigned to the same assignee as the present invention. These applications were all filed on Feb. 11, 1972 and have the Ser. Nos. 5,085, 5,086, and 5,090. The titles of these applications are respectively, "Serial Integrating and Filter Circuits," "Number Selection and Limiting Circuits," and "Pulse Stretcher." For the purposes of completing the disclosure as to the contents various digital blocks in the present application, I wish to incorporate the teachings of the above-referenced previously filed applications including the fact that the block require clock and sync bit inputs not shown in this application.

In view of the above it is an object of this invention to provide an improved error rate derivative circuit.

Other objects and advantages of the present invention will be apparent from a reading of the specification and appended claims in conjunction with the single FIGURE relating to a preferred embodiment of the invention shown in block diagram form and attached to this application.

In the FIGURE a summing circuit 10 is shown having a first input lead 12 and a second input lead 14. The input lead 12 is connected to a command or control signal and in the summing circuit 10 is subtracted from any signals appearing on lead 14. Summing circuit 10 is thus a subtractor and supplies the difference signal on a lead 16 to a summing circuit 18. The lead 14 is also supplied to a 16 bit shift register or word storage means 20 having an output connected to an input of a summing circuit 22. The shift register 20 has its output connected to the subtraction input of summing circuit 22 where this input is subtracted from a second input of summing circuit 22 connected directly to lead 14. The lead 14 receives all of its signals from a condition or position encoder 24. The difference output of the input signals to summing circuit 22 is supplied to a sign detection circuit 26 having leads 28 and 30 as outputs. As explained in the above-referenced applications, output lead 28 is raised to a logic 1 value (for the entire next word time) when the input is a positive polarity number and the lead 30 is raised to a logic 1 value (for the entire next word time) when the input digital word is a negative numerical value. The leads 28 and 30 are connected to like inputs of a multiplying circuit 32 having an input 33 connected to a not-synchronization bit (SB) signal lead. In other words, lead 33 is a logic 1 during the first 15 bits of a 16 bit digital word. The 16th digital bit is a sign indicating bit and occurs simultaneous with the synchronization bit. This is further explained in the above-referenced applications. An output of multiplying circuit 32 is supplied as a second input to summing circuit 18. An output of summing circuit 18 is applied to a further summing circuit 34 having a further input connected to an output of a shift register 36. An output of summing circuit 34 is connected to an overflow detection circuit 38 having positive and negative leads 40 and 42 respectively connected to like inputs on a motor or condition responsive means 44. A further output of overflow detection circuit 38 is connected via a lead 46 to an input of the shift register or word storage means 36. A mechanical output of motor 44 is connected via a dash line representation of a shaft 48 to the position encoder 24 and may extend therethrough to an output for controlling a condition.

While a motor 44 is shown as being responsive to the condition control circuit, it is obvious that other condition responsive means may be used. One example would be a valve in a chemical mixing circuit with the block 24 providing a feedback signal indicative of the conditions of the solution being mixed. Such conditions may involve acidity or other values. Also, the motor 44 would in most instances incorporate a pulse stretcher such as shown in my last referenced application.

The overflow detection circuit 38, as explained in the above-referenced applications, provides an output on lead 46 which is the same digital word as applied at the input thereto as long as it does not exceed a predetermined maximum value. This predetermined maximum value in the embodiment shown is the same as the capacity of the shift register 36. When the input word exceeds this maximum value, the difference between the maximum value and the input word then appears on the output lead 46 and a further logic one appears on either output lead 40 or 42 for the entire time of the word following the overflow condition to indicate that the incoming word which exceeded the maximum value was either positive or negative in accordance with which one of the two leads 40 and 42 is activated. The motor 44 receives this logic one value for either the positive or negative input and turns in one direction or the other in accordance therewith for the time representative of one word time.

Since the above-referenced applications utilized a 16 bit digital word, this application has also used the same length word for convenience in reference and explanation.

As further explained in the above-referenced applications the multiplying circuit 32 supplies an output indicative of the word supplied on input lead 33 and only if a logic one appears on either of leads 28 or 30. If an input appears on lead 28, the output of 32 is the same value as appears on input 33. However, if a logic one appears on lead 30, the polarity is reversed. Since the connection of the not-synchronization bit produces logic 1's during the first 15 bits and a logic zero during the 16th bit, this is equivalent to the positive number 32,767.

The operation of the invention will now be explained starting with the feedback signal from encoder 24. If this digital word remains the same for a plurality of word times, thereby indicating that motor 44 is not operating, the two signals or words applied to summing circuit 22 will be the same. In other words, the delay of one word time in word storage means 20 will still produce the same value output word as directly applied to the positive input of summing circuit 22. Thus, there will be no difference output word or in other words it will be a zero and thus the sign detection circuit 26 will have no output. This is due to the design of the sign detection circuit in not providing an output as long as the input is zero. With a no input, the multiplying circuit 32 has no output for supplication to summing circuit 18. It may be assumed that the reasons the motor 44 is not moving is because it is positioned exactly as the command signal dictates on lead 12. If this is so, there is no output on lead 16 and thus no input to the integrating circuit comprising blocks 34–38.

As explained in the first above-referenced application, the integrating circuit operates to store each received word in the shift register 36 and add it to the word presently being received. After this storage has occurred a sufficient number of times, the stored word exceeds the maximum storage capabilities of shift register 36. At this time the overflow detection circuit 38 senses this excessive size word, subtracts the resulting summation word received from summing circuit 34 from the maximum permissible word and provides the difference output back to shift register 36 and for one word time following provides the overflow indication on either lead 40 or 42. However, if there is no input from summing circuit 18, the integrating circuit cannot alter the magnitude of the word stored in shift register 36.

In actuality, it is very seldom that the motor will be positioned exactly at the value desired and as set at the command input 12. Thus, there will normally be some small digital number on lead 16. This will then slowly integrate in the integrating circuit and eventually provide a pulse output to motor 44. To reduce instability in the control circuit, the encoder of the embodiment shown provides logic zeros in the five least significant bit positions. Thus, the motor 44 would have to receive several pulses before the output from position encoder 24 would change the digital word value. When the motor 44 did react enough to change the output of position encoder 24, the summing circuit 22 would indicate that there was a difference between the last word value and the present word value and thus the sign detection circuit 26 would provide an output. This would be multiplied times 32,767 in multiplying circuit 32 and summed with the difference from summing circuit 10. Since the feedback signal changed by a value of 32 (six bit positions), the multiplication times 32,767 provides a gain in the error rate circuit of approximately 1,000. However, this gain occurs only when the output from the position encoder 24 changes from its previous value. Thus, the summing circuit 18 would provide a large value to the integrating circuit only once in a great while for the conditions of the motor being close to the desired command value. The 32,000 input from multiplying circuit 32 to summing circuit 18 may be enough to integrate the integrating circuit to provide an overflow output condition on this attempt to produce a pulse but since the motor requires several pulses to change the position encoder to a new output, there will be no further inputs from the error rate circuit comprising blocks 20–32.

It may now be assumed that a large numerical word value command is supplied on 10 and the motor is initially in a non-moving condition. This large value word on command lead 12 will provide a large value output on 16 since it will be greatly different as compared with the feedback signal on lead 14. There will be no input from the error rate derivative circuit via multiplying circuit 32 since it may be assumed that the position encoder 24 is in the same position as previously. Thus, the integrating circuit 34–38 will receive a large value which may or may not provide overflow conditions. If overflow conditions are not immediately obtained, they will be obtained soon. Thus, an output lead which may be lead 40 is activated for a word time following the overflow condition. The motor 44 will react to the pulse and move the position encoder. With a large input on 12, the motor 44 will receive input pulses every few word times. Whenever the motor 44 moves position encoder 24 enough to change the word output, the rate derivative circuit 20–32 will provide an additional input to the integrating circuit. As will be realized, the larger difference between the command and the feedback signal, the more often the motor 44 will move the position encoder 24 to provide an output and thus, the more often the rate derivative circuit will provide an output to be added to the digital word applied from summing circuit 18 to the integrating circuit.

Conversely, as the motor approaches the desired condition, the position encoder will change its output digital words less often and the rate derivative circuit will provide extra outputs less often.

As will be observed from the above, the circuit illustrated provides a large velocity command to the control mechanism (i.e., motor 44) when a large movement is to take place and the commanded velocity of the control mechanism of the rate derivative circuit diminishes as the desired condition is approached. This corresponds with the action of most known rate derivative servo mechanism control circuits.

While a single embodiment of the present invention has been disclosed, it will be realized that other embodiments falling within the scope of the invention will be apparent to those skilled in the art. Thus, I wish to be limited not by the embodiments shown in the specification but only by the scope of the appended claims.

I claim:

1. Serial digital word, rate sensitive, servo apparatus comprising, in combination:

first summing means including first and second input means and an output means;

serial digital word signal supplying first means for supplying a command signal to said first input of said first summing means;

first word storage means including input means and output means;

second summing means including first and second input means and output means, said first input means of said second summing means being connected to said output means of said first word storage means for receiving serial digital words therefrom;

signal supplying second means for supplying serial digital words to said second inputs of said first and second summing means and to said input of said first word storage means, the signal being supplied by said second signal supplying means comprising a feedback signal;

third signal summing means including a first input means connected to said output means of said first summing means, including a second input means and including an output means;

sign detection means including input means and output means, said input means of said sign detection means being connected to said output means of said second summing means;

multiplying means including first and second input means and output means, a signal appearing on said second input appearing at the output of said multiplying means and having a sign dependent upon the signal supplied to said first input means thereof;

signal supplying third means connected to said second input means of said multiplying means for supplying serial digital words thereto;

means connecting said output means of said sign detection means to said first input means of said multiplying means;

means connecting said output means of said multiplying means to said second input of said third summing means;

fourth summing means including first and second input means and output means, said first input means of said fourth summing means being connected to said output means of said third summing means;

detection means including input means and first and second output means, said detection means having a prescribed maximum digital word capability whereby the output on said second output remains the same as the input if less than predetermined maximum and is the difference between the word appearing on the input and said maximum if it exceeds the maximum, said detection means being further constructed to provide an output on one of said first output means representative of the polarity of the input digital word when said predetermined maximum is exceeded; and second word storage means connected between said second output of said detection means and said second input of said fourth summing means.

2. Apparatus as claimed in claim 1 wherein said first and second summing means provide an output indicative of the difference between digital words supplied at said first and second input means and said third and fourth summing means provide an output indicative of the additive value of words supplied at said first and second inputs thereof.

3. Apparatus as claimed in claim 1 comprising in addition:

motor means including an input means connected to said first output means of said detection means, the motor rotating in either of two directions depending upon the signal received from said first output means of said detection means;

position encoding means connected to said motor and including an output means for supplying a digital output word indicative of the position of the output of said motor means as compared to an arbitrary reference; and means connecting said digital word output of said position encoder means to said signal supplying second means.

4. Error rate derivative circuit apparatus comprising, in combination:

command signal supplying first means for supplying a first signal indicative of a condition to be performed;

condition responsive signal supplying second means for supplying a second signal indicative of a condition being performed, said first and second signals having serial digital word formats whereby the serial digital words are continuously repeated on a periodic time basis until altered;

first comparision means connected to said first and second means for providing an output indicative of the difference in numerical value of the serial digital words received therefrom;

second comparison means connected to said second means for providing an output indicative of the difference between the signal being received from said second means at a given point in time and the signal received from said second means at a previous time period and providing an output indicative thereof;

summing means connected to said output means of said first and second comparison means for receiving serial digital words therefrom, said summing means providing an output indicative of the additive value thereof; and serial digital word integrating means connected to receive the additive output from said summing means and providing outputs on first and second terminals thereof upon each occasion that said integrating means exceeds a predetermined maximum due to the continuing integration of digital words supplied to the input thereof, the one of said first and second outputs providing an indication depending upon the polarity of the integrated word.

5. Apparatus as claimed in claim 4 and comprising in addition:

signal responsive means connected to said first and second outputs of said integrating means and providing output for altering a condition;

condition sensitive means connected to said signal responsive means and responsive to a condition to be monitored and providing a digital output signal to said second means indicative of the condition being monitored.

6. Apparatus as claimed in claim 4 wherein said integrating means comprises, in combination:

summing means including first and second inputs, the first input being connected to the input of said integrating means, said summing means further including an output;

overflow detection means including input means and first, second and third output means, the one on said first and second output means supplying a signal being indicative of the polarity of signals received at said input means and occurring only in response to the signal being received at the input exceeding a predetermined maximum, the signal at said third output being the same as the signal received at said input of said overflow detection means when said word is less than a predetermined maximum and is the difference between the maximum and the word received when it exceeds a said predetermined maximum;

means connecting the output of said summing means to the input means of said overflow detection means; and word storage means connected between said third output means of said overflow detection means in said second input means of said summing means.

* * * * *